3,549,484
METHOD AND APPARATUS FOR THE RECOVERY OF SULFITE WASTE LIQUORS
Jan Hojnos and Ivan Grancic, Bratislava, Czechoslovakia, assignors to Prvni Brnenska Strojirna, Zavody Klementa Gottwalda, narodni podnik, Brno, Czechoslovakia
Continuation-in-part of application Ser. No. 435,746, Feb. 26, 1965. This application Aug. 28, 1967, Ser. No. 663,654
Int. Cl. D21c 11/12
U.S. Cl. 162—36                                                14 Claims

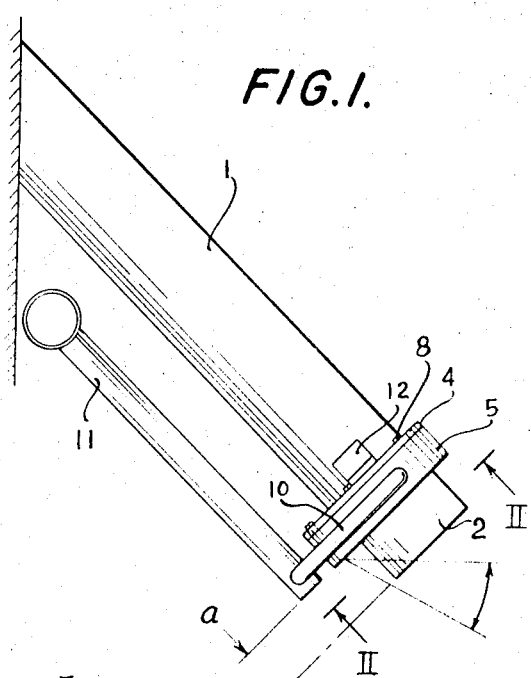
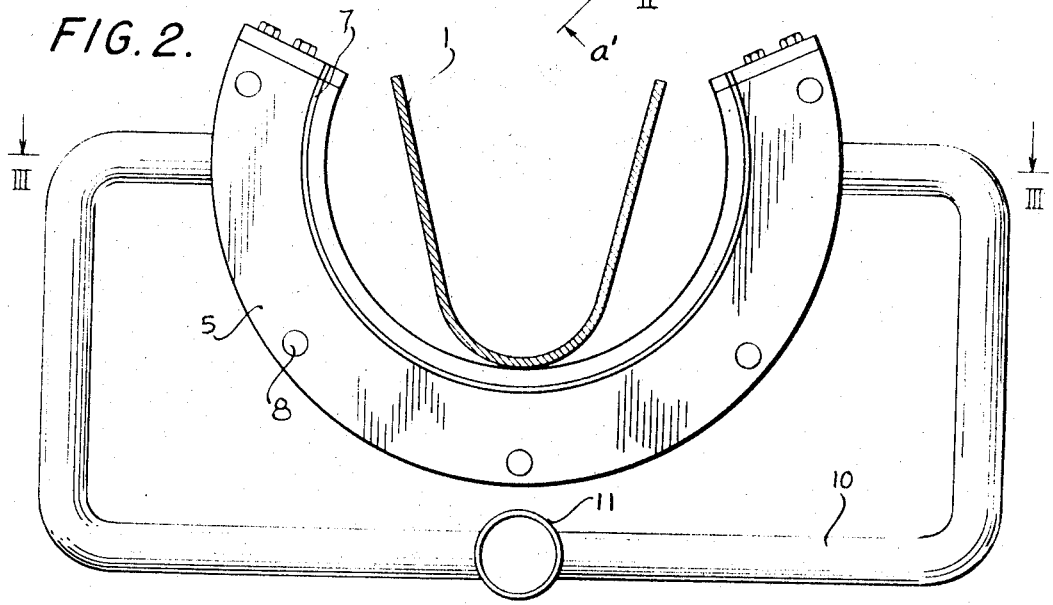
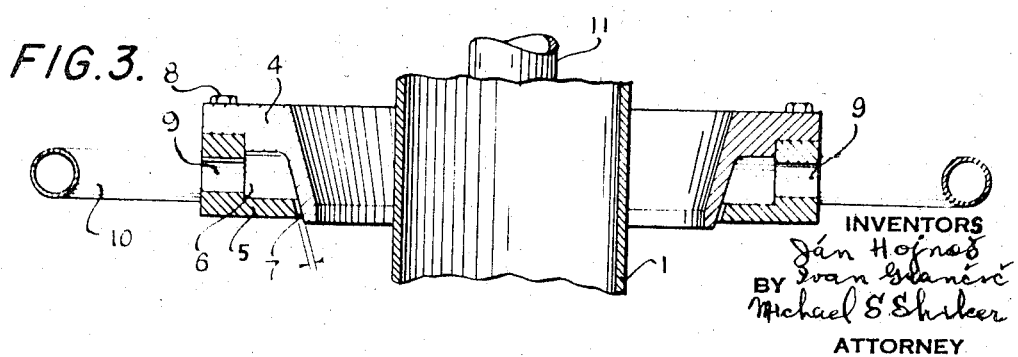
INVENTORS
Ján Hojnoš
Ivan Štanćrć
BY
Michael S Striker
ATTORNEY

United States Patent Office 3,549,484
Patented Dec. 22, 1970

ABSTRACT OF THE DISCLOSURE

A method and apparatus for the recovery of concentrated sulfite solution from sulfite and bisulfite waste liquors by heating and oxidizing the waste liquor for the removal of organic matter and water therefrom and for forming a stream of smelt of the residue of the waste liquor, which stream is penetrated by a blast of gas at superatmospheric pressure and sufficiently low temperature to convert the smelt into a solid pulverulent material which is then contacted by an oxidizing gas so that the pulverulent material will be oxidized, followed by dissolution of the oxidized pulverulent material in water and introduction of sulfur dioxide into the thus formed solution.

CROSS-REFERENCES TO RELATED APPLICATIONS

The present application is a continuation-in-part of our copending application Ser. No. 435,746, filed Feb. 26, 1965, and now Pat. No. 3,471,263.

BACKGROUND OF THE INVENTION

The present invention relates to a method and arrangement for recovering sulfite and bisulfite liquors and, more particularly, the present invention is concerned with the recovery of sodium sulfite and sodium bisulfite liquors which accrue in the production of cellulose from wood pulp and the like by treatment with neutral or acidic sodium sulfite.

Such methods require either to utilize the organic constituents of the waste liquor or to render the same harmless and, furthermore, to recover the spent active constituents of the liquor so that the same may be reused.

Several recovery methods have been proposed, however, have met with only little practical success.

Thus, two methods were proposed which are based on the oxidation of the sodium sulfide in the smelt after concentration and combustion of the organic constituents of the waste liquor.

According to one of these methods, the smelt was cooled and then ground to a powder which was then passed in countercurrent to air, whereby contact with the oxygen of the air was supposed to cause oxidation of the sulfide to sulfite. However, this method did not meet with practical success.

According to another method, the highly concentrated aqueous solution of the smelt is introduced into a rotary kiln, wherein, in contact with air the suspended sodium sulfide is to be oxidized to sulfite. In this case too it was not possible to find a practical solution for the difficulties found to be inherent in this process.

The spraying or atomizing of the molten inorganic salts-containing smelt which was to flow from the lower portion of the recovery furnace into a dissolution tank was accomplished up to now by means of a pipe having a flattened opening through which air or steam was blown into the smelt before the same dropped into the dissolution tank. This spraying arrangement is rather imperfect since it causes only partial comminution of the smelt and this again results in rather severe explosions when relatively large bodies of smelt having a temperature of between 700 and 900° C. are dropped into the dissolution tank. These explosions are dangerous and create a health hazard. Furthermore, due to the explosions and the relatively high temperature of the smelt, the independently arranged flattened spray pipe which is located below the trough leading from the regenerating vessel will be frequently bent and as a result thereof, the spraying medium or fluid will then only incompletely or not at all contact the stream of smelt which is to be atomized. In this case, the explosions caused by the direct flow of the stream of hot smelt into the liquid in the dissolution tank will become so severe that the process has to be interrupted in order to repair or replace the spray pipe.

The present invention has as one of its objects to provide a method and arrangement which will permit recovery of sulfite waste liquors in a simple and economical manner and without being subject to the difficulties encountered when proceeding in accordance with the above described prior art methods.

SUMMARY OF THE INVENTION

The present invention proposes a method for the recovery of sodium sulfite and sodium bisulfite waste liquors, according to which a concentrated sulfite solution is recovered from the waste liquors by heating and oxidizing the latter so as to remove organic matter and water therefrom and to form a stream of smelt of the residue of the waste liquor. The thus formed stream of smelt is then penetrated by a blast of a gas, generally air, at superatmospheric pressure and a temperature of up to about 150° C., so as to subdivide the stream of smelt and, with the help of secondary cooling air, to convert the smelt into a solid pulverulent material which may be classified into a coarser and a finer fraction. After comminution of the coarser fraction, both fractions are contacted with an oxidizing gaseous medium, preferably consisting of air and steam and being at an elevated temperature of between about 50 and 400° C. The proportions of steam and air should be such that the partial pressure of the molecular oxygen in the gaseous medium will equal between about 40 and 150 mm. Hg. Thereby, the combined fractions of the pulverulent material will be oxidized. The oxidized gaseous material is then separated from the oxidizing gas and the latter is recycled for heating and oxidizing subsequent portions of waste liquor. The oxidized pulverulent material is then dissolved in an aqueous liquid and sulfur dioxide is introduced into the thus formed solution, whereby a sulfite liquor may be recovered which is suitable for use as digesting liquor in the production of cellulose or may form part of such digesting liquor.

The present invention also includes an arrangement for carrying out the above discussed process, which arrangement comprises, in combination, a recovery furnace for burning sulfite waste liquor under formation of a smelt, a first vessel communicating with the recovery furnace by means of a conduit which includes a nozzle into which the smelt and a gas under pressure and at relatively low temperature are introduced, and from which nozzle emanates a spray of smelt particles which will solidify, a screening device for separating the solidified smelt particles of the spray into a coarser and finer fraction, comminuting means for the separated coarser fraction, a reaction vessel for receiving the finer and the comminuted fraction of the particles and for receiving oxidizing gas so that the particles will be oxidized by the oxidizing gas, and means for dissolving the oxidized particles in an aqueous liquid and for introducing sulfur dioxide into the thus formed solution. According to a broader concept of the arrangement of the present invention, it is, for instance, possible to delete therefrom the screening and comminuting means and to introduce the freshly solidified pulverulent smelt particles directly into the oxidizing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 1–3 illustrate a particularly advantageous device for atomizing the smelt.

FIG. 1 is a schematic elevational view of the conduit leading from the recovery furnace and of the atomizing arrangement connected therewith;

FIG. 2 is a schematic cross sectional view taken along line II—II of FIG. 1;

FIG. 3 is a cross sectional view taken along line III—III of FIG. 2; and

DESCRIPTION OF THE PREFERRED EMBODIMENTS

Figure 4:
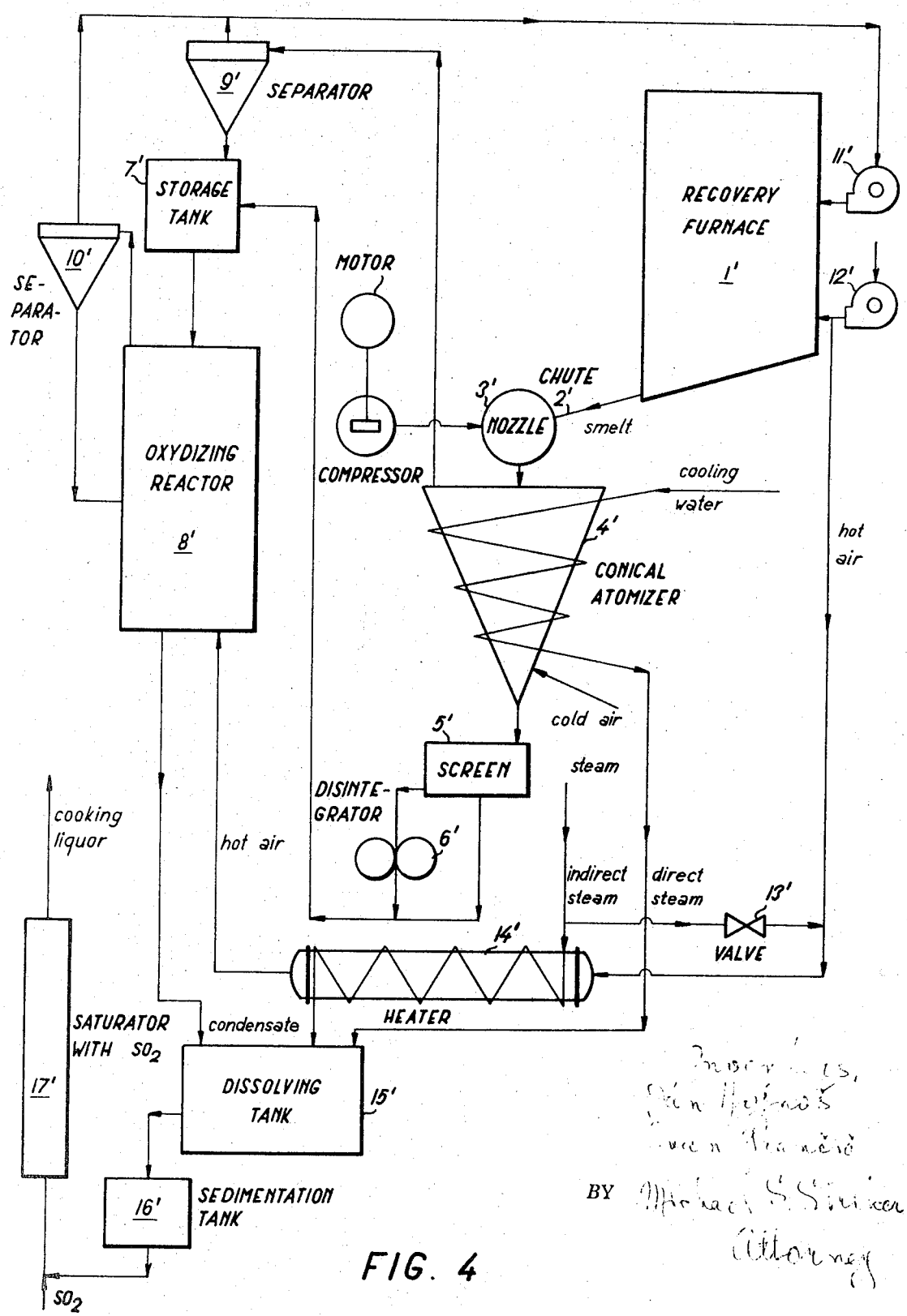
FIG. 4 is a schematic illustration in the nature of a flow sheet of an arrangement for the recovery of sulfite liquor from waste liquors in accordance with the present invention.

According to the method of the present invention, the smelt flowing from the recovery furnace is atomized by contact with a gaseous medium under pressure, preferably a gauge pressure of between about 3 and 10 atmospheres, and changed by the effect of a secondary gaseous medium which preferably consists of low pressure air, i.e., air supplied by means of a fan, into a solid powder having a temperature of between about 20 and 150° C., i.e., much lower than the temperature at which the smelt leaves the recovery furnace. Preferably, the thus obtained pulverulent material is graded by size and the main intermediate portion, excluding the fines and the very coarse particles is then introduced into an oxidizing device, preferably a fluid bed reactor in which the pulverulent mass is fluidized and treated with an oxidizing gas.

In order to achieve complete oxidation of the sulfide, the oxidizing gas preferably will contain such a proportion of steam that the partial pressure of oxygen in the fluidized bed will be equal to between 40 and 150 mm. Hg, and the period of contact between the oxygen and the sulfide-sulfite will be between one-half hour and three hours. Such contact preferably will be maintained while the pulverulent sulfide-sulfite is in fluidized condition.

It is preferred to use as oxidizing gas an air-steam mixture because the presence of steam will serve to speed up selective oxidation of the sulfide to sulfite and substantially prevent undesirable sulfate formation. The hot gases which are formed by contacting the stream of smelt with the atomizing gas or air, as well as the waste gases of the fluidized bed reactor are recycled as combustion air into the recovery furnace. The very fine fly dust, or the fines from the atomizing of the smelt and from the fluid bed reactor are also returned into the regenerating vessel together with the waste gases.

The coarse portion of the pulverized smelt is separated in a sifter and ground prior to introduction into the fluid bed reactor.

The oxidizing gases are introduced into the fluid bed reactor at a temperature of between 50 and 400° C. and at such speed that the pulverulent material in the reactor will form a fluidized bed.

The oxidized pulverulent material which is continuously withdrawn from the fluid bed reactor is dissolved in water and after saturation with gaseous sulfur dioxide used again as cooking liquor. In this manner, the recovery cycle is completed. By the repeated utilization of the hot waste gases accruing during the atomizing of the smelt derived from the recovery furnace and of the hot waste gases from the fluidized bed reactor, the heat which is absorbed by these gases from the smelt, during atomizing of the same and during the exothermic oxidation of the sulfides in the fluidized bed reactor is, for all practical purposes, completely recovered.

The circular flow of the fines (which are returned to the regenerating vessel) and the utilization of the heat as well as of the oxygen of the waste gases in the recovery of subsequent portions of spent liquor in the recovery furnace represents a very significant advantage of the present invention.

Preferably, the spraying or atomizing device is arranged underneath a conduit or elongated trough through which the smelt passes from the recovery furnace. The atomizing device comprises two segments of semi-circular cross section which are connected with each other and which form between themselves a chamber for the atomizing medium or gas, which chamber communicates with a more or less semi-circular gap or partly annular outlet opening of preferably adjustable width and inclination.

Preferably the gap is located in a conical surface forming an angle of between 10 and 45° with the axis of the conduit or trough about which the conveying member forming such gap is arranged.

The conveying or atomizing device is firmly arranged at the lower side of the elongated trough or conduit, preferably at a ditsance of between 50 and 100 mm. from the outlet end thereof. The trough usually extends downwardly from the recovery furnace, substantially at the inclination indicated in FIG. 1. One of the segments of the atomizing device includes an inlet for the generally gaseous atomizing medium. The gap or partly annular outlet opening through which the atomizing medium will leave the atomizing device is so constructed that the gaseous atomizing medium, for instance, air or steam will leave the gap under a pressure of between about 3 and 11 absolute atmospheres. The stream of atomizing fluid will be directed through the gap towards the molten stream having passed through the open end of the elongated trough or conduit, in the shape of a partially cone-shaped shell and will cause that the entire stream of smelt is drawn into the area of the apex of the cone defined by the stream of atomizing medium so that the smelt will be finely subdivided or atomized in the area of the apex of the cone.

It is particularly advantageous to arrange the atomizing device directly at the lower portion of the conduit for the smelt leading from the recovery furnace, in the vicinity of the open end of such conduit or elongated trough because, upon movement of the trough during operation, the position of the atomizing device relative to the trough will not change and the atomizing device will not come in direct contact with the smelt. The subtsantially semi-circular cross section of the gap and of the entire atomizing device has the further advantage that a highly effective partially cone-shaped stream of atomizing fluid will be directed towards the smelt, however, without any possibility of plugging the atomizing device with portions of the smelt. The arrangement of the present invention is excellently suitable not only when it is desired to finely subdivide the smelt so that the smelt in such subdivided form would then drop into a solution contained in a dissolution vessel, but also for methods according to which the smelt is finely subdivided so as to form thereof a dry pulverulent product.

Referring now to the drawing, and particularly to FIGS. 1–3, it will be seen that the illustrated device comprises an open channel-shaped conduit 1 which is arranged downwardly inclined as shown in FIG. 1 and has an open outlet end 2. Near this outlet end, preferably at a distance of between 50 to 150 mm. from this outlet end, as indicated by arrows *a* and *a'*, there is arranged an annular distributing member consisting, as shown in FIGS. 2 and 3, of two annular members 4 and 5 forming a chamber 6 between themselves. These annular members are shaped so as to form a conical gap 7 the conicity of which is such that the conical surface in which this gap is located intersects the axis of the conduit 1 in front of the outlet opening thereof. The two annular members 4 and 5 are secured to each other by the screws 8. Furthermore, the chamber 5 is provided with two inlet openings 9 which communicate with inlet conduit 10. This inlet conduit has an inlet pipe 11 adapted to be connected with a source of gaseous medium. The entire distributing arrangement is secured by brackets 12 to the outer face of the channel-shaped conduit 1, preferably by welding or the like.

The process and arrangement will now be further described in connection with the schematic showing or flow sheet of FIG. 4.

During the production of cellulose by the sodium-bisulfite process without free $SO_2$ the collected waste liquors are concentrated to 60% of dry substance and burnt in the recovery furnace 1'. Having burnt these liquors in an amount e.g. of 10,000 kg. of dry substance per hour, the smelt amounting e.g. to 2,000 kg. and containing 5% of sulfide and 45% of sodium carbonate flows out of the recovery furnace 1' having a temperature of 900° C. and via chute 2' reaches nozzle 3'. In nozzle 3' the smelt is atomized by air supplied at a gauge pressure of between about 3 and 10 atmospheres by a compressor and motor in an amount of e.g. 200 m.$^3$/hour and at a temperature of 20° C. The atomized smelt is finely sprayed into the conical vessel-atomizer 4' provided with a double jacket cooled by water. Into said conical atomizer 4' tangentially are supplied 8,000 m.$^3$/hour of cold air having a gauge pressure of 0.03 kg./cm.$^2$, under the influence of which the atomized smelt solidifies and changes into granules having a temperature of 200° C. The pulverized product is then sorted in screen 5', disposed beneath the conical atomizer 4', into a coarse mesh portion above 1 mm. size and a fine portion of less than 1 mm. size. The coarse mesh portion is disintegrated in disintegrator 6' and both portions are then introduced through the storage tank 7' into the oxidizing reactor 8'. Into the storage tank 7' falls also fine flue dust separated in the cyclone separator 9' from the waste gas derived from conical atomizer 4', which waste gas is sucked off by fan 11' of the recovery furnace 1'. Into the bottom of the oxidizing reactor 8' is introduced an air and steam mixture amounting to 10,000 m.$^3$/hour and having a temperature of 150° C. in which the partial pressure of molecular oxygen amounts to 80 mm. Hg. The dimensions of the oxidizing reactor are chosen in such a manner that the pulverized product remains there for 2 hours so that complete oxidation of sodium sulfide is obtained. The oxidation waste gases are drawn off through the cyclone separator 10' together with other waste gases, by fan 11' into the recovery furnace 1', to serve as combustion air. The hot air drawn out of the recovery furnace 1' by fan 12' is mixed with steam by means of reducing valve 13'. The mixture is heated up by indirect steam in heater 14' and introduced into the oxidizing reactor 8' as stated above. The oxidized pulverized product containing sodium carbonate, sodium sulfite and sodium sulfate, is led into the dissolving tank 15' where it is dissolved. Into the dissolving tank 15' are introduced the cooling water supplied to the jacket of conical atomizer 4' and the condensate from heater 14'. The dissolved, oxidized product is then sedimented in the sedimentation tank 16' and by being saturated with gaseous $SO_2$ in saturator 17' it is converted into sulfite cooking solution. In this manner the recovery cycle is completed.

Basically, the technological process according to the invention is carried out as described above, but, for instance, the temperature of the air and steam mixture introduced into the oxidizing reactor, the air-to-steam ratio and the reaction time may be changed. The temperature may vary preferably between 110° C. and 150° C., and the partial pressure from 80 mm. of mercury to 120 mm. of mercury. The reaction time may range from about ½ to 3 hours. The preferred values are 130° C., 105 mm. of mercury of partial molecular oxygen pressure and a residence time of pulverized product in the oxidizing reactor of 2½ hours.

The amount of smelt may be 1,800 to 2,400 kg./hour, preferably 2,000 kg./hour. The temperature of the smelt may be 700 to 900° C. preferably 900° C. The pressure granulating gaseous medium may have a gauge pressure of 4 to 8 kg./cm.$^2$, preferably 8 kg./cm.$^2$ and may be supplied in an amount of 200 to 400 m.$^3$/h., preferably 400 m.$^3$/hour. The low-pressure cooling gaseous medium may have a temperature of 20 to 150° C. and may be supplied in an amount of 8,000 to 16,000 m.$^3$/h., preferably 8,000 m.$^3$/h. The partial pressure of oxygen may amount to 40 to 150 mm. Hg., preferably between 80 and 150 mm. Hg. By this partial pressure the proportions of air and steam in the gaseous mixture are determined.

It will be understood that each of the elements described above, or two or more together, may find a useful application in other types of arrangements differing from the types described above.

While the invention has been illustrated and described as embodied in a recovery arrangement for waste liquors obtained in the production of cellulose from wood pulp or the like by treatment with neutral or acidic sodium sulfite, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be protected by Letters Patent is set forth in the appended claims.

1. In a method of recovering sodium sulfite and sodium bisulfite liquor from a smelt formed of sulfite or bisulfite waste liquor, the steps of forming a stream of said smelt consisting essentially of substantially water-free and substantially organic matter-free residue of said waste liquor; directing into said stream of smelt from a plurality of locations circumferentially thereof and at an acute forward angle a stream of gas at super-atmospheric pressure and having a temperature below the solidification temperature of said stream of smelt so as to become intimately admixed with, finely subdivide and cool said smelt and to convert the same into a solid pulverulent material; and fluidizing the thus formed solid pulverulent material in an oxidizing gas so as to oxidize said solid pulverulent material, whereby upon dissolution of said oxidized pulverulent material in an aqueous liquid and introduction of sulfur dioxide into the thus-formed solution sulfite liquor is recovered.

2. A method according to claim 1, wherein said oxidizing gas includes molecular oxygen in an amount corresponding to a partial oxygen pressure of between about 40 and 150 mm. Hg.

3. A method according to claim 2, wherein said fluidizing of said solid pulverulent material in said oxidizing gas is carried out for a period of between about 30 minutes and 3 hours.

4. A method according to claim 1, wherein said smelt is formed by heating and oxidizing said waste liquor so as to remove organic matter and water therefrom, said gas of said stream of gas contacting said smelt is air, air is substantially separated from said solid pulverulent material prior to fluidization thereof in an oxidizing gas, and said separated air is recycled for heating and oxidizing subsequent portions of said waste liquor.

5. A method according to claim 1, wherein the recovery of sodium sulfite and sodium bisulfite waste liquors is carried out by heating and oxidizing said waste liquor so as to remove organic matter and water therefrom; forming a stream of the thus formed smelt consisting of said waste liquor substantially free of water and organic matter; contacting said stream of smelt along at least part of its circumference with an at least partially conical air stream of relatively low temperature and superatmospheric pressure converging towards the axis of said stream of smelt at said acute angle so as to finely subdivide and cool said smelt and to convert the same into a solid pulverulent material; substantially separating fines and air from the remainder of said solid pulverulent material; recycling the thus separated fines and air for heating and oxidizing subsequent portions of said waste liquor; and fluidizing the remainder of said solid material in an oxidizing gas, thereby oxidizing said solid material.

6. A method according to claim 5, wherein coarse particles are separated from said solid pulverulent material prior to fluidization of the same.

7. A method according to claim 5, wherein a concentrated sulfite solution is recovered from sulfite and bisulfite waste liquors by heating and oxidizing said waste liquor so as to remove organic matter and water therefrom and to form a stream of smelt of the residue of the waste liquor, said method comprising penetrating said stream of smelt with a blast of air at superatmospheric pressure and a temperature of up to about 150° C. so as to convert said stream of smelt into a solid pulverulent material, classifying said solid pulverulent material into a coarser and a finer fraction, disintegrating said coarser fraction, contacting both fractions with an oxidizing gaseous medium having a temperature of between about 50 and 400° C. including stream and molecular oxygen in an amount such that the partial pressure of said molecular oxygen equals between about 40 and 150 mm. Hg so as to oxidize said fractions of pulverulent material, withdrawing gaseous products, recycling said withdrawn gaseous products for the heating and oxidizing of subsequent portions of waste liquor, dissolving said oxidized pulverulent material in an aqueous liquid, and introducing sulfur dioxide into the thus formed solution, thereby recovering a sulfite liquor suitable for use in the production of cellulose pulp.

8. An apparatus for recovery of sulfite waste liquors comprising, in combination, recovery furnace means for burning sulfite waste liquor under formation of a smelt; a first vessel; conduit means communicating with said recovery furnace and said first vessel for passing smelt from said recovery furnace means to said first vessel, said conduit means including nozzle means having an outlet for a stream of said smelt and communicating with the interior of said first vessel, and an arcuate nozzle for a stream of gas under pressure partially surrounding said outlet and being inclined with reference to the latter so that said stream of gas includes an acute angle with the axis of said stream of smelt and penetrates the latter from a plurality of different circumferential locations for intimate admixture and production of a spray directed into said first vessel and including solidified pulverulent smelt particles; oxidizing means comprising a second vessel for receiving oxidizing gas and said pulverulent particles, and for causing oxidation of said particles by said oxidizing gas; and conveying means operatively associated with said first vessel and said oxidizing means for conveying said pulverulent particles to said oxidizing means.

9. An apparatus as defined in claim 8, and including screening means operatively connected with said first vessel for receiving said pulverulent particles and separating the same into a coarser and a finer fraction; comminuting means operatively connected with said screening means for receiving and comminuting said coarser fraction, said screening means and said comminuting means being operatively connected with said conveying means.

10. An apparatus as defined in claim 8, and including dissolving means operatively connected with said oxidizing means and including fluid inlet and outlet means, for receiving oxidized particles from said oxidizing means and for dissolving said particles in a liquid introduced into said dissolving means through said fluid inlet means.

11. An apparatus as defined in claim 10, wherein said fluid inlet means of said dissolving means include first inlet means for introduction of a liquid solvent for said oxidizing particles, and second inlet means for introduction of sulfur dioxide gas into the solution formed in said dissolving means.

12. An apparatus as defined in claim 8, wherein said first vessel is an upwardly flaring substantially conical vessel defining a downwardly directed tip, wherein said spray of solidified smelt particles is directed towards the interior of said tip, and wherein said screening means communicate with said tip of said conical vessel.

13. An apparatus as defined in claim 12, wherein said recovery furnace means include a recovery furnace having a bottom portion, and wherein said conduit means communicate with said bottom portion of said recovery furnace.

14. An apparatus as defined in claim 13, and including means for recycling gas from said oxidizing means to said recovery furnace.

References Cited
UNITED STATES PATENTS

| | | | |
|---|---|---|---|
| 3,309,262 | 3/1967 | Copeland et al. | 162—30 |
| 3,420,626 | 1/1969 | Shick et al. | 162—30 |
| 3,471,263 | 10/1969 | Hojnos et al. | 23—252 |

S. LEON BASHORE, Primary Examiner

T. G. SCAVONE, Assistant Examiner

U.S. Cl. X.R.

23—48, 131, 262; 159—47; 162—30